Jan. 7, 1958 E. GRANBERG 2,818,752
CHAIN SAW SHARPENING AND JOINTING APPARATUS
Filed July 1, 1955 2 Sheets-Sheet 1

INVENTOR
ELOF GRANBERG
BY
Featherstonhaugh & Co.
ATTORNEYS

Jan. 7, 1958  E. GRANBERG  2,818,752
CHAIN SAW SHARPENING AND JOINTING APPARATUS
Filed July 1, 1955  2 Sheets-Sheet 2

INVENTOR
ELOF GRANBERG
BY
Fetherstonhaugh & Co.
ATTORNEYS

United States Patent Office 2,818,752
Patented Jan. 7, 1958

2,818,752

CHAIN SAW SHARPENING AND JOINTING APPARATUS

Elof Granberg, Burnaby, British Columbia, Canada, assignor to Nygran Industries Ltd., Vancouver, British Columbia, Canada Application July 1, 1955, Serial No. 519,595

9 Claims. (Cl. 76—31)

This invention relates to apparatus for sharpening or filing the teeth of saw chains, and for jointing said chains.

The cutting chains of chain saws extend around elongated cutter bars and are power driven when the saw is in operation. Chain saw teeth are sharpened by means of cylindrical, diamond and flat files, and the latter files are used for jointing. Prior to this invention, the files were operated by hand so that the sharpening and jointing depended very much upon the skill of the filer.

Jointing a chain saw means fixing the depth to which each tooth cuts. The chain saws now in common use have depth gauges throughout their lengths, and these ride on the bottoms of the kerfs.

The relationship of the gauges to the cutter teeth is such that they determine the depth of cut in the wood. If the ends of the gauges are filed down, the teeth cut deeper into the wood.

The apparatus of this invention is designed so that it will hold any type of file. The apparatus includes a base which may be clamped on a cutter bar over the chain extending therearound. Suitable clamping jaws are provided for holding the chain firmly in position while a tooth is being filed. The file is held by a frame which is slidably mounted on the base. The angle of the frame to the saw chain may be adjusted vertically and/or longitudinally of the cutter bar. The frame may be swung to sharpen teeth on either side of the bar.

These and other advantages will be evident from the following description.

Figure 2:
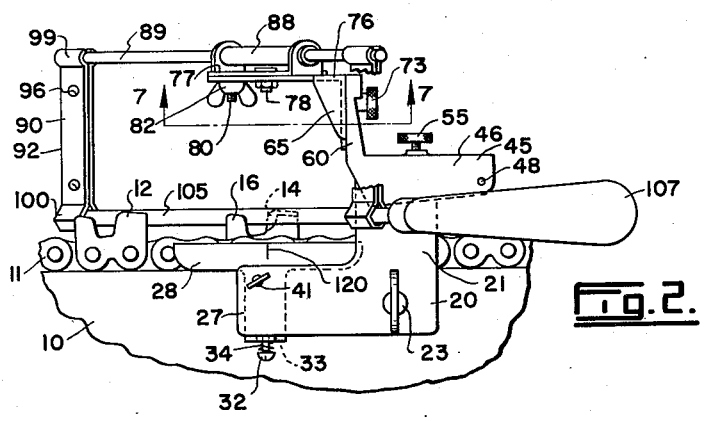
Figure 1:
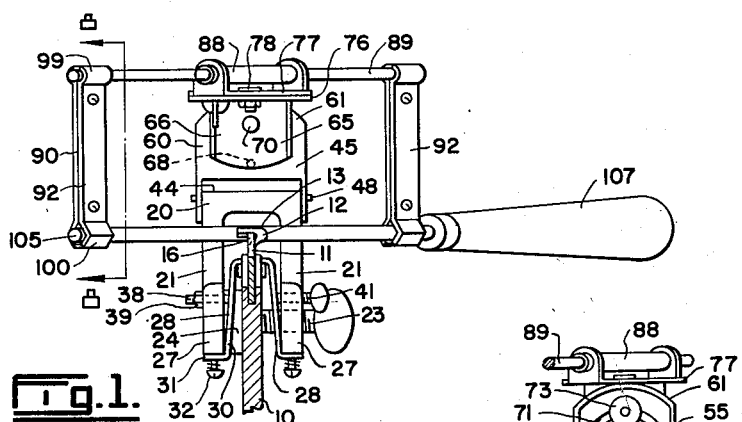
Figure 7:
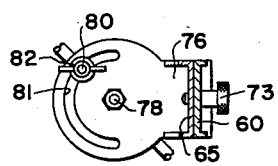
Figure 3:
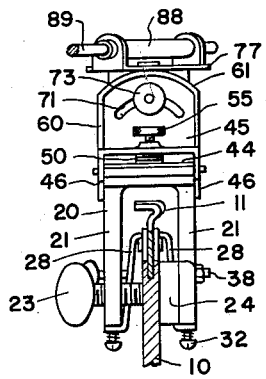
Figure 4:
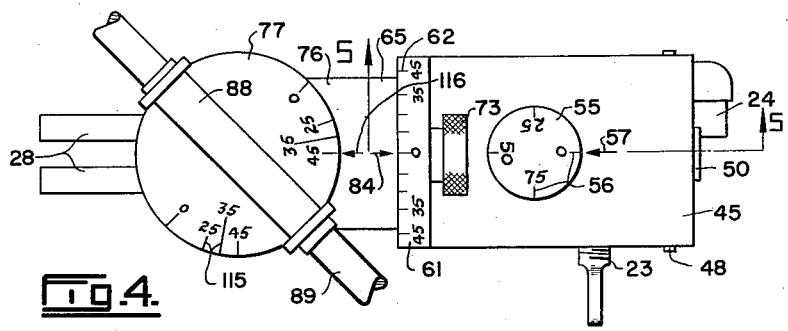
Figures 5, 8:
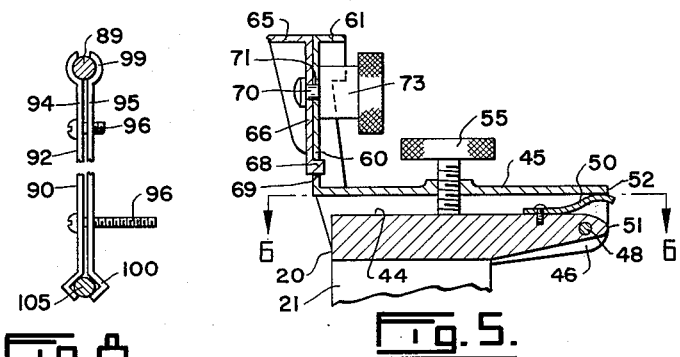
Figures 6, 9:
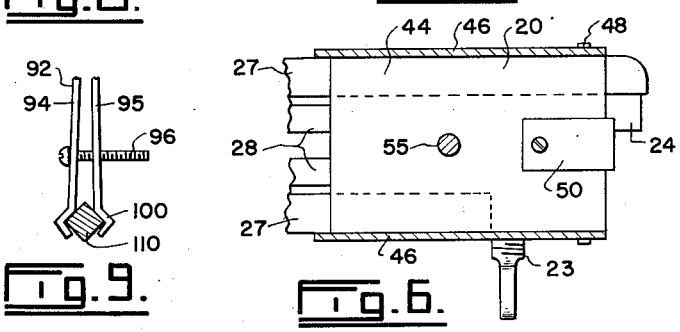
Figure 10:
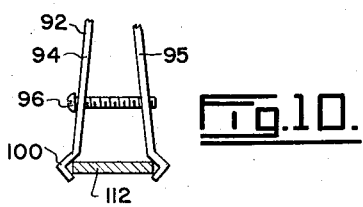

An example of this invention is illustrated in the accompanying drawings, in which, Figure 1 is an end elevation of the apparatus mounted on a cutter bar, Figure 2 is a side elevation of the apparatus, Figure 3 is an elevation of the end of the apparatus opposite to that shown in Figure 1, Figure 4 is a plan view, Figure 5 is a vertical section taken on the line 5—5 of Figure 4, Figure 6 is a horizontal section taken on the line 6—6 of Figure 5, Figure 7 is a horizontal section taken on the line 7—7 of Figure 2, Figure 8 is a vertical section taken on the line 8—8 of Figure 1, and Figures 9 and 10 are views similar to Figure 8 showing diamond and flat files, respectively, in place.

Referring to the drawings, 10 is a portion of a cutter bar around which a saw chain 11 extends. This chain may be of any desired construction, and it may have any desired form of cutting tooth, or any combination of cutting teeth. In this example, the chain has cutter teeth 12, each of which has a bent over outer portion 13. The forward edges of the side of the tooth and its portion 13 are formed with a continuous curved cutting edge 14 which must be sharpened by a cylindrical file extending transversely of the chain at an angle to the longitudinal plane of the cutter bar, this angle usually being approximately 45°. This type of tooth is well-known in the industry and is in common use today. The tooth also has a depth gauge 16 spaced from the cutting edge thereof. As is well-known in the art, these gauges determine the depth of the cut made by the tooth. While the gauge has been shown on the tooth in this example, some chains have the gauges on links separate from the cutting teeth.

This sharpening and jointly apparatus includes a base 20 having spaced parallel side members 21 depending therefrom. These members are spaced apart sufficiently to fit over cutter bar 10, and a set screw 23 is provided for firmly securing the base to the bar. The set screw is threaded through one of the members, and a pad 24 may be provided on the other member opposite the screw against which the latter presses the bar, see Figures 1 and 3. Base members 21 have parallel projections 27 extending outwardly therefrom, said projections carrying gripping jaws 28. These jaws are positioned inside projections 27 and extend longitudinally of the device. Each jaw has a downwardly-extending arm 30 which is bent over at its lower end at 31 to overlap the bottom edge of the adjacent base projection. A screw 32 extends through an enlarged hole 33 in each portion 31 and into the lower edge of the base projection. A spring 34 is positioned between the head of this screw and the portion 31 so that each jaw 28 is resiliently secured to its base projection.

It is desirable to lock one of the jaws 28 in position for a particular chain saw, and to be able to move the other jaw towards and away from the first jaw. For this purpose, a set screw 38 is threaded through one of the projections 27 and bears against the outer surface of the jaw mounted on said projection. A lock nut 39 is provided on this screw so that the latter may be locked in any adjusted position. A set screw 41 is threaded through the other projection 27 and bears against the outer surface of the other jaw.

When the base 20 is clamped on to the cutter bar 10 by means of screw 23, chain 11 extends between the gripping jaws 28. When it is desired to hold the chain in position on the bar, screw 41 is turned to move its jaw 28 against the side of the chain, pressing the latter against the other jaw 28 which is retained in a predetermined position by set screw 38. When it is necessary to move the chain, screw 41 is loosened to permit this to be done.

The upper or outer end of base 20 is formed with a table 44. This table extends across the outer end of the base and projects beyond one side thereof, see Figure 5.

A horizontal support 45 is spaced outwardly from the table 44 and has side flanges 46 extending downwardly therefrom overlapping the sides of the base. The flanges of this support are pivotally connected to the table by a pin 48 extending through the latter and the flanges. A spring 50 is secured to the top of table 44 and projects a little beyond the end 51 of the latter. This spring is so placed that when support 45 is pivoted away from the table, its end 52 bears against and presses the outer end of the spring inwardly. Therefore, this spring has a tendency to urge the main portion of the support back towards the table. A set screw 55 is threaded through the support and bears against the table. This screw may be turned to cause the support to move towards and away from the table. The upper surface of the head of screw 55 has graduations 56 around the edge thereof, said graduations representing thousandths of an inch. An indicator mark 57 is provided on the upper surface of support 45 near the set screw.

A vertical support 60 projects upwardly from horizontal support 45 at the end thereof remote from pin 48. The vertical support and a curved upper edge 61 having graduations 62 thereon representing degrees of a circle.

An angular bracket 65 is pivotally mounted on the vertical support 60. This bracket has a vertical portion 66 having a pin 68 as its lower edge which projects through a small opening 69 in the vertical support. This enables the bracket to be swung laterally around pin 68. A bolt 70 is secured to the bracket portion 66 and projects through an arcuate slot 71 in the vertical support 60. An adjusting nut 73 threaded on this bolt retains the bracket in any adjusted position.

Bracket 65 has a horizontal portion 76 upon which a disc 77 is mounted by means of a pivot bolt 78. This disc has a bolt 80 projecting downwardly through an arcuate slot 81, in the horizontal portion 76 of the bracket, and a nut 82 is threaded on this bolt. This nut may be turned to loosen the disc to allow it to be rotated, and then tightened firmly to hold the disc in position.

An indicator mark 84 is placed on the portion 76 of the bracket near graduations 62 on the upper edge of vertical support 60. This indicates the degree of tilt of the bracket relative to the vertical support.

A sleeve 88 is fixedly mounted on disc 77, and a rod 89 of a file frame 90 slidably extends through this sleeve. The frame also includes end members 92 at the opposite ends thereof. Each of these members is actually in the form of a clamp, and includes parallel straps 94 and 95 removably held together by screws 96 near opposite ends thereof. The straps are formed with upper jaws 99 at one end and lower jaws 100 at the opposite end thereof. The jaws 99 of each set of straps are clamped around one end of rod 89, while the jaws 100 of said straps are, in Figures 1 and 8, clamped around a cylindrical file 105 having a handle 107 at one end thereof.

Figure 9 shows jaws 100 gripping a diamond-shaped file 110 while Figure 10 shows said jaws gripping a flat file 112.

Graduations 115 representing degrees of a circle may be placed on disc 77. An indicator mark 116 on the horizontal portion of bracket 65 indicates the position of the disc by means of the graduations 115.

When it is desired to sharpen and/or joint saw chain 11, the sharpening and jointing apparatus is mounted on and secured to cutter bar 10 in the manner described above. For sharpening, the desired tooth 12 is moved into a position beneath the pivot bolt 78 around which sleeve 88 swings. A mark 120 may be provided on the outer surface of one of the jaws 28 immedately below said pivot bolt in order to indicate where the cutting edge 14 of the tooth should be positioned for proper sharpening. Set screw 41 is tightened so that the jaws 28 firmly hold the tooth and chain in position. Disc 77 is rotated and secured in position so that file 105 is positioned at the desired angle relative to the plane of the cutter bar and the tooth to be filed. Frame 90 is swung downwardly to position the file within the space between the cutting edge 14 of the tooth and gauge 16, and it may at this time be necessary to raise the horizontal support 45 until the file is immediately over the space in the tooth, after which the support is released so that the file can drop straight down into the space. The file is then pressed against the curved cutting edge and reciprocated until said edge is sharpened. If necessary, set screw 55 may be turned to raise the horizontal support in order to move the file into the correct position relative to the tooth. In order to remove the file, it is swung away from the cutting edge towards the gauge, and then the horizontal support 45 is raised to move the file away from the tooth.

Saw chains of this type usually have a number of left and right cutter teeth. With one setting, all the left teeth may be sharpened. Then in order to sharpen the right teeth, the disc 77 is rotated through an angle of 90° and fixed in the new position. This sets the file at the correct position for the right teeth.

There are other types of cutter teeth which require either the diamond-shaped file 110 of Figure 9, or the flat file 112 of Figure 10. The appropriate file is mounted in the filing frame for each saw chain to be sharpened. The angle of the file across the chain is adjusted in the manner explained above by rotating disc 77. If it is necessary to tip the file relative to the chain, nut 73 is turned to loosen bracket 65 so that the latter may be tilted in the desired direction. The nut is then tightened to hold the bracket in the adjusted position.

The flat file 112 is used for jointing the chain. Jointing is accomplished by filing the outer ends of depth gauges 16. The depth gauge to be filed is moved opposite the indicating mark 120 and the chain clamped in position. Set screw 55 is turned to raise or lower the file into the correct position relative to the gauge. Then the outer end of the gauge is filed until the file clears it. Once the apparatus is set for this purpose, then each gauge may be moved into position and filed so that it is exactly the same length as all the other gauges.

What I claim as my invention is:

1. In apparatus for sharpening and jointing a chain saw while on the cutter bar thereof, a base, means for clamping the base to a cutter bar over the saw chain thereof, a support mounted on the base for movement towards and away from the latter, means for adjusting the support towards and away from the base, a bracket carried by the support extending substantially parallel to the cutter bar, said bracket being tiltable relative to the support, securing means for retaining the bracket in adjusted positions on the support, a sleeve rotatably mounted on the bracket and extending generally at an angle to the plane of the cutter bar, means for securing the sleeve in adjusted positions on the bracket, a frame having a rod slidably and swingably extending through the sleeve, and a file carried by the frame spaced from and substantially parallel with the rod, said file extending across the cutter bar plane.

2. Sharpening and jointing apparatus as claimed in claim 1 including clamping means on the base for retaining the chain of the cutter bar stationary in the plane of the latter.

3. In apparatus for sharpening and jointing a chain saw while on the cutter bar thereof, a base, means for clamping the base to a cutter bar over the saw chain thereof, a horizontal support pivotally mounted on the base for movement towards and away from the latter, a vertical support projecting upwardly from the horizontal support, a pin carried by the vertical support over the cutter bar and extending longitudinally of the latter, an angular bracket having a vertical portion carried by the pin and swingable laterally around the pin axis, securing means for retaining the bracket in adjusted positions on the vertical support, a substantially horizontal portion on the vertical portion of the bracket, a disc mounted on and parallel with said horizontal portion of the bracket, pivot means connecting the disc to the horizontal portion to permit the former to rotate on the latter, securing means for retaining the disc in adjusted positions on the horizontal portion, a sleeve fixedly mounted on the disc and extending generally at an angle to and across the plane of the cutter bar, a frame having a rod slidably and swingably extending through the sleeve, and a file carried by the frame spaced from and substantially parallel with the rod, said file extending across the cutter bar plane.

4. Sharpening and jointing apparatus as claimed in claim 3 including means for finely adjusting the support towards and away from the base.

5. Sharpening and jointing apparatus as claimed in claim 3 in which the upper end of the vertical support is curved with the centre of curvature coinciding with the pin axis, graduations in degrees on said curved end, and an indicator mark on a portion of the bracket adjacent the graduations.

6. Sharpening and jointing apparatus as claimed in claim 5 including corresponding graduations in degrees on the disc on opposite sides of the sleeve, and an indicator mark on the horizontal portion of the bracket near the disc graduations.

7. Sharpening and jointing apparatus as claimed in claim 3 including spring means engaging the horizontal support normally tending to swing it about its pivot towards the base, and a set screw threaded through the horizontal support and bearing against the base, rotation of said screw in opposite directions moving the support away from and towards the base.

8. Sharpening and jointing apparatus as claimed in claim 3 including clamping means on the base for releasably gripping the saw chain of the cutter bar to prevent any movement thereof relative to the bar.

9. In apparatus for sharpening and jointing a chain saw while on the cutter bar thereof, a base, means for clamping the base to a cutter bar over the saw chain thereof, a sleeve mounted on the base spaced outwardly of the saw chain of a cutter bar to which the base is clamped, said sleeve being rotatable on the base to different angles relative to the bar plane and its axis extending at an angle to the plane of the cutter bar, a rod slidably extending through the sleeve, a pair of parallel straps at each end of the rod having jaws at opposite ends thereof, screw means removably holding each pair of straps together and clamping one set of jaws thereof around the rod, and a file removably gripped by the other jaws of the straps and extending substantially parallel with the rod.

References Cited in the file of this patent

UNITED STATES PATENTS

| | | |
|---|---|---|
| 96,871 | Bell | Oct. 19, 1869 |
| 310,735 | Sherman | Jan. 13, 1885 |
| 327,774 | Dale | Oct. 6, 1885 |
| 384,829 | Eaton | June 19, 1888 |
| 409,866 | Penrose | Aug. 27, 1889 |
| 1,435,954 | Carron | Nov. 21, 1922 |
| 2,568,062 | Fitch | Sept. 18, 1951 |
| 2,594,821 | Stone et al. | Apr. 29, 1952 |
| 2,633,761 | Butts | Apr. 7, 1953 |
| 2,677,289 | Fitch | May 4, 1954 |
| 2,693,724 | Currie | Nov. 9, 1954 |
| 2,736,216 | Paradis et al. | Feb. 28, 1956 |